United States Patent [19]

Hinn

[11] Patent Number: 4,689,679

[45] Date of Patent: Aug. 25, 1987

[54] BRIGHTNESS AND AUTOMATIC KINESCOPE BIAS CONTROL IN A VIDEO SIGNAL PROCESSOR WITH AN AC COUPLED KINESCOPE DRIVER

[75] Inventor: Werner Hinn, Zollikerberg, Switzerland

[73] Assignee: RCA Corporation, Princeton, N.J.

[21] Appl. No.: 886,406

[22] Filed: Jul. 17, 1986

[30] Foreign Application Priority Data

Oct. 1, 1985 [GB] United Kingdom ............... 8524198

[51] Int. Cl.$^4$ ..................... H04N 5/14; H04N 5/16; H04N 9/16; H04N 5/68
[52] U.S. Cl. ..................... 358/168; 358/34; 358/74; 358/171; 358/243
[58] Field of Search ............... 358/168, 171, 242, 243, 358/74, 34

[56] References Cited

U.S. PATENT DOCUMENTS

| | | | |
|---|---|---|---|
| 4,263,622 | 4/1981 | Hinn | 358/74 |
| 4,293,874 | 10/1981 | Reneau | 358/171 |
| 4,387,405 | 6/1983 | Hinn | 358/243 |
| 4,414,577 | 11/1983 | Tallant, II et al. | 358/34 |
| 4,484,228 | 11/1984 | Parker | 358/243 |
| 4,549,214 | 10/1985 | Hinn | 358/172 |
| 4,599,641 | 7/1986 | Troiano | 358/168 |
| 4,600,950 | 7/1986 | Hinn | 358/171 |
| 4,612,576 | 9/1986 | Hinn | 358/171 |
| 4,633,321 | 12/1986 | Tallant, II et al. | 358/74 |

OTHER PUBLICATIONS

Copending U.S. patent application Ser. No. 656,369 of Werner Hinn, filed Oct. 1, 1984.

*Primary Examiner*—Howard W. Britton
*Assistant Examiner*—John K. Peng
*Attorney, Agent, or Firm*—Paul J. Rasmussen; Peter M. Emanuel; Ronald H. Kurdyla

[57] ABSTRACT

A wideband video signal processor includes a kinescope driver stage which is AC coupled to the kinescope, and an automatic kinescope bias (AKB) control system. During AKB operating intervals, the kinescope is energized so as to produce a cathode output pulse with a magnitude related to the level of black current conducted by the kinescope. Brightness control is achieved by coupling a brightness control voltage to a signal path which conveys the cathode output pulse to AKB signal processing circuits.

5 Claims, 3 Drawing Figures

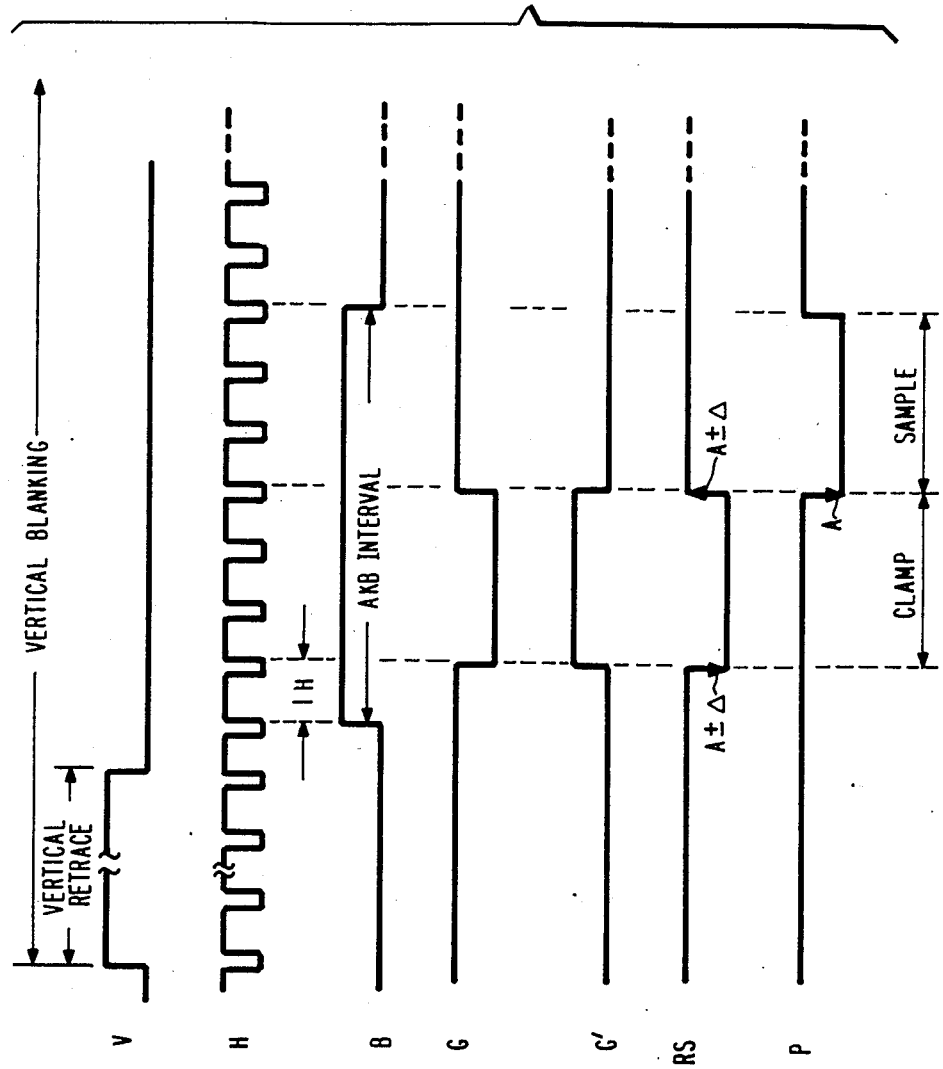

BRIGHTNESS AND AUTOMATIC KINESCOPE BIAS CONTROL IN A VIDEO SIGNAL PROCESSOR WITH AN AC COUPLED KINESCOPE DRIVER

This invention concerns apparatus for providing brightness control in a wideband video signal processing and display system, such as a video monitor, including an AC coupled display driver stage and a circuit for automatically controlling the bias of an associated image display device.

A conventional television receiver for processing broadcast television signals, e.g., according to NTSC broadcast standards as used in the United States, is intended to process a video signal with a bandwidth limited to approximately 4.2 MHz at the high frequency extreme. A display driver amplifier for an image displaying kinescope in such a system must exhibit a corresponding bandwidth capability. Also in such a system, the DC bias for the signal input electrode of the kinescope is often related to the output DC bias condition of the driver amplifier, which may vary in accordance with the setting of an image brightness control of the system.

Recent trends toward high definition video signal display systems with significantly increased picture resolution capability, including high resolution television receivers and data display monitors, dictate the need for a video signal processing system with significantly wider signal bandwidth capability compared to conventional systems, and wide bandwidth kinescope driver amplifiers in particular. For various reasons it is desirable to maintain a substantially fixed output DC bias condition for a wideband kinescope driver amplifier. Output bias variations such as produced in response to adjustment of bias controls including an image brightness control require a kinescope driver operating supply voltage large enough to accommodate output DC level shifts associated with such adjustments. Large supply voltages are undesirable in a wideband kinescope driver because of the resulting increased power consumption and dissipation which would result for a wideband kinescope driver which is often already operating at increased DC current levels. In addition, wideband kinescope driver transistors sometimes exhibit low voltage ratings which do not permit the use of a larger supply voltage required to accommodate DC output voltage shifts. Bias voltage variations also influence the capacitance parameters of the driver transistors, undesirably causing operating bandwidth variations with shifts in transistor DC bias. The driver transistor operating bandwidth capability also varies with the current gain of the transistor, which is a function of transistor bias current.

Consequently, wideband kinescope drivers often do not permit DC bias shifts such as would otherwise be required for brightness control, for example, and often employ capacitor (AC) coupling between the output of the kinescope driver stage and the kinescope. Such capacitor coupling requires that bias adjustment and brightness control be accomplished at the signal input electrode (e.g., the cathode electrode) of the kinescope, such as by means of a DC restoration clamping circuit coupled to the kinescope cathode. The cathode clamping level is adjusted in accordance with a desired kinescope bias and in accordance with a desired image brightness level such as in the manner disclosed in my U.S. Pat. No. 4,549,214, for example.

Video signal processing and display systems such as television receivers and video monitors sometimes employ an automatic kinescope bias (AKB) control system for automatically maintaining a desired black current level for each electron gun of the kinescope. As a result of this operation, displayed picture colors and gray scale tracking of the kinescope are prevented from being adversely affected by variations of kinescope bias from a desired level due to aging and temperature effects, among other factors. Various types of AKB systems are known, such as are described in my U.S. Pat. Nos. 4,263,622 and 4,387,405 for example.

An AKB system typically operates during image blanking intervals when the kinescope conducts a small black level representative current. This current is sensed by the AKB system to generate a bias control signal representing the difference between the sensed black current level and a desired black current level, and the bias control signal is applied to video signal processing circuits with a sense for reducing the difference. In some AKB systems the kinescope bias is adjusted to the desired level by applying the bias control signal to the kinescope driver stage for varying the output bias of the driver stage, and thereby varying the bias of the signal input electrode (e.g., the cathode electrode) of the kinescope such that proper kinescope bias is maintained. Such systems require that the kinescope be DC coupled rather than AC coupled (capacitively coupled) to the output of the driver stage. However, AC rather than DC coupling of the driver stage to the kinescope is often desirable in wideband systems when it is desirable to maintain a substantially fixed DC output bias for the driver stage.

An AKB system which is advantageously capable of being used in a video signal processing system having an AC coupled kinescope driver stage is described in my copending U.S. patent application Ser. No. 656,369 titled "Automatic Kinescope Bias System With AC Coupled Video Output Stage," filed Oct. 1, 1984. In that AKB system, as well as in the AKB systems described in my aforementioned U.S. Patents, an induced kinescope cathode output pulse, with a magnitude related to the level of kinescope black current to be controlled, is produced in response to a pulse applied to a grid electrode of the kinescope. It is herein recognized that it is difficult to employ an AKB system of that type in a video signal processing system having an AC coupled kinescope driver stage, unless the brightness control device is located in the video signal path before the capacitor which AC couples the output of the kinescope driver stage to the kinescope cathode. However, a brightness control device positioned in such manner will vary the DC output level of the kinescope driver stage, which is undesirable in a wideband system for the reasons mentioned earlier.

In accordance with the principles of the present invention, there is disclosed herein apparatus which advantageously permits the use of a brightness control device situated after the capacitor which AC couples the output of the display driver stage to the signal input of the display device, in a system including an AKB system of the "induced pulse" type mentioned previously. In an illustrated preferred embodiment of the invention, a signal representative of the magnitude of black image current conducted by the display device is generated. A bias control network provides a bias control signal to the display device to maintain a desired bias condition for the display device, in response to the magnitude of a derived signal related to the black current representative signal. Image brightness control is achieved by varying the magnitude of the related signal. In the disclosed system the related signal is derived from a signal combining point to which the black current representative signal and a prescribed fixed amplitude signal are applied.

In the drawing

FIG. 3 shows signal waveforms helpful in understanding the operation of the AKB system.

Figure 1:
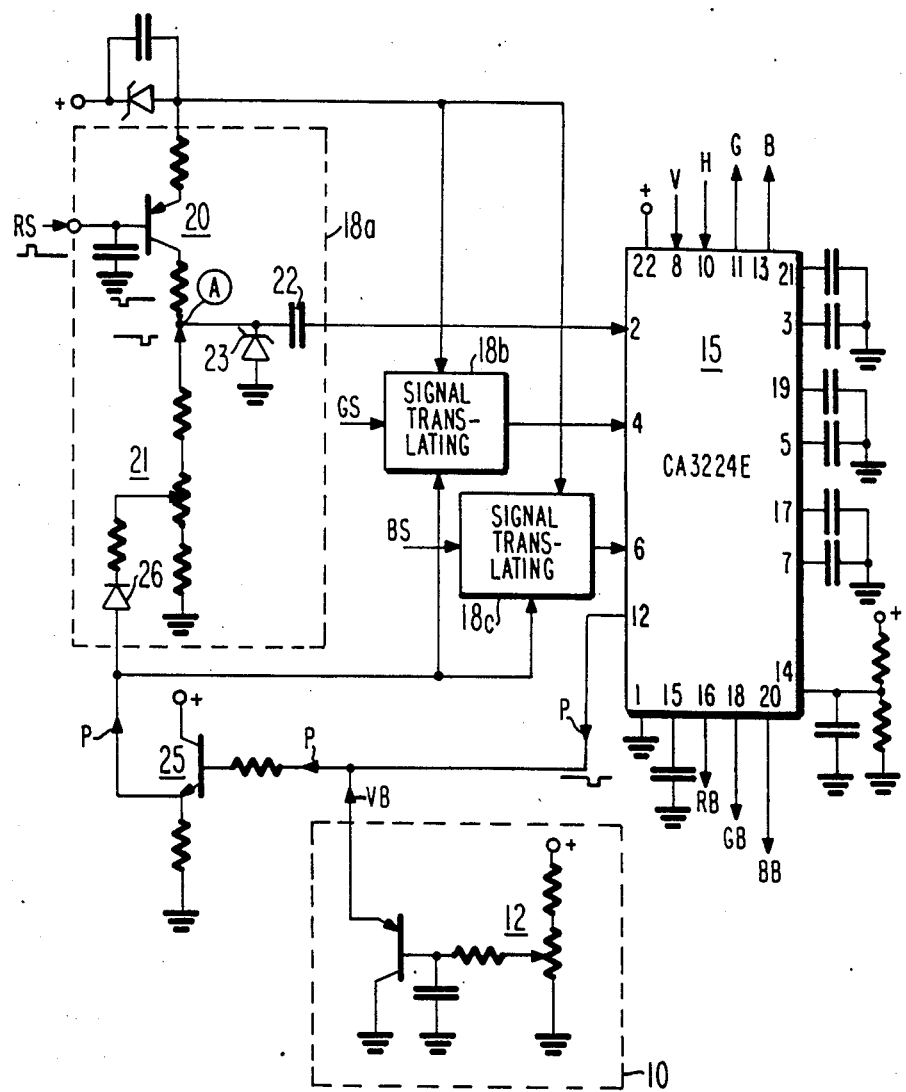
FIG. 1 shows brightness control and AKB apparatus in accordance with the present invention for use in a wideband video monitor.

The video monitor system of FIG. 1 includes a source of brightness control voltage 10 which produces a variable brightness control voltage VB in response to the setting of a viewer adjustable brightness control potentiometer 12. Voltage VB is at a maximum positive level for producing maximum brightness when the wiper of potentiometer 12 is at the uppermost setting. Conversely, minimum brightness is produced at the lowermost setting of the wiper of control 12.

The system of FIG. 1 also includes an AKB signal processor integrated circuit 15, which is the type CA 3224E integrated circuit commercially available from the Solid State Division of RCA Corporation, Somerville, NJ. Information concerning the structure and operation of the CA 3224E integrated circuit is found in the RCA preliminary data bulletin for the CA 3224E, file No. 1553. Additional information concerning the use of this integrated circuit is found in an article titled "An Automatic Kinescope Biasing System", authored by J. C. Tallant, II, et al., published in the IEEE Transactions on Consumer Electronics, Vol. CE-30, No. 4, Nov. 1984.

Briefly, circuit 15 receives horizontal (H) and vertical (V) synchronizing signals, derived from deflection circuits of the monitor, for generating output signals G, B and P. Signal G is a periodic pulse which is employed to excite (forward bias) the control grid electrode of a kinescope (shown in FIG. 2) during AKB operating control intervals for inducing a kinescope cathode output pulse with a magnitude related to the magnitude of black current conducted by the kinescope. Signal B is a blanking signal which encompasses the AKB operating control interval. Signal B is used to blank or inhibit video signals prior to the kinescope driver stage, as will be seen from FIG. 2, so that the video signals do not interfere with the opertion of the AKB system. Input terminals 2, 4 and 6 of AKB processor circuit 15 are respectively coupled to the red, green and blue video signal channels for receiving respective sensed black current representative signals during given AKB intervals.

Figure 2:
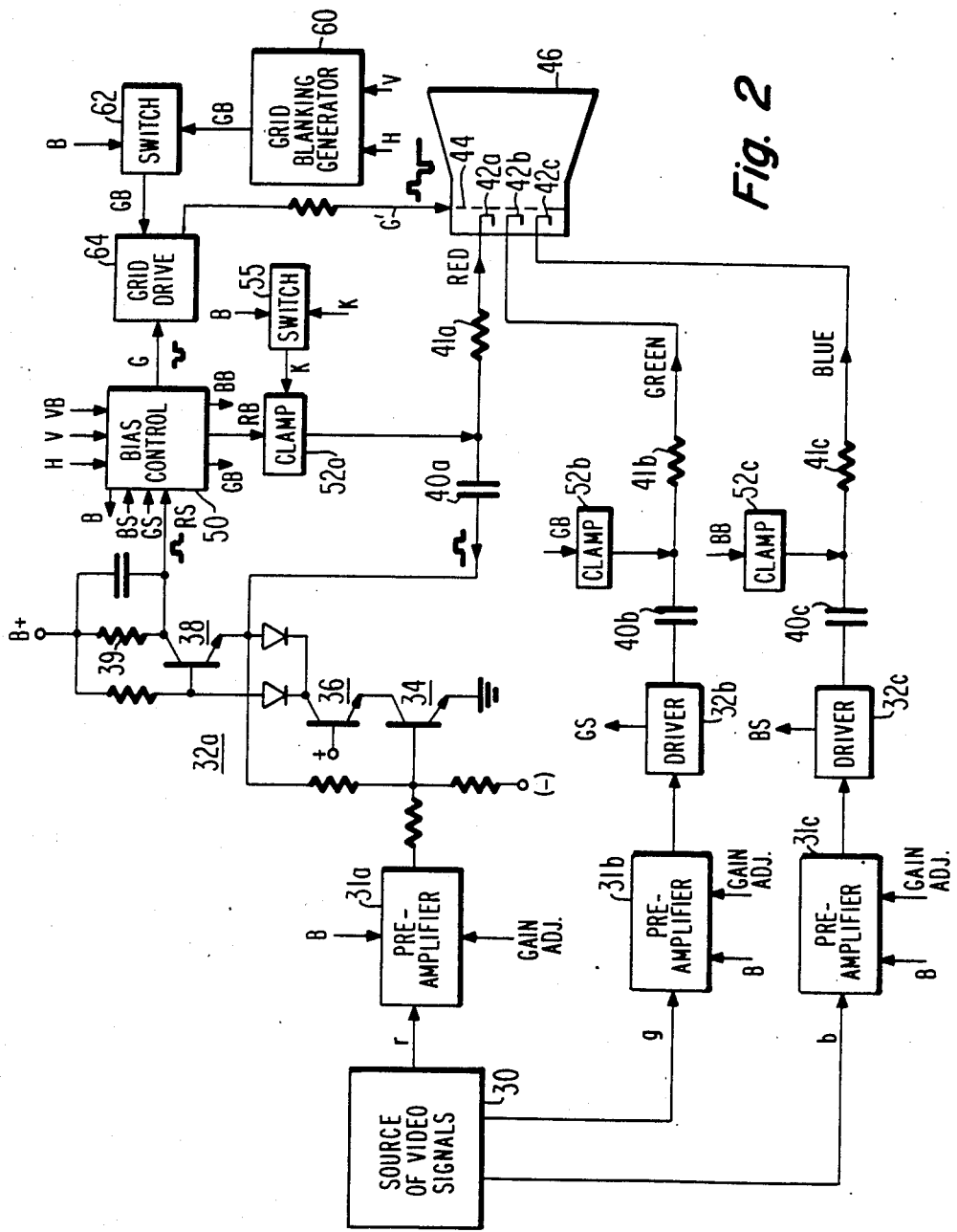
FIG. 2 shows a portion of a wideband video monitor including the apparatus of FIG. 1.

Illustratively, a sensed black current representative positive pulse signal RS for the red channel, produced as will be discussed in connection with FIGS. 2 and 3, is AC coupled via a signal translating circuit 18a to input terminal 2 of circuit 15. Signal RS derives from a black current representative induced cathode output pulse produced in response to excitation of the kinescope grid, as will be seen from FIG. 2. Circuit 18a includes a signal inverting amplifier transistor 20 which receives signal RS, a brightness tracking potentiometer 21 in a collector output circuit of transistor 20, an AC coupling capacitor 22, and a Zener diode 23 for clipping large signal amplitudes appearing during image trace intervals, all arranged as shown. Brightness tracking potentiometer 21 is required for each color channel in systems where brightness is adjusted after the video signal gain (contrast) setting, to scale the brightness setting of each channel according to the gain of each channel so that proper image white balance results. Signal translating circuits 18b and 18c respectively receive sensed black current representative signals GS and BS from the green and blue video signal channels for application to input terminals 4 and 6 of circuit 15, and are similar in structure and operation to circuit 18a.

AKB circuit 15 includes plural signal processing circuits, including clamping, sampling and comparator circuits, respectively responsive to translated input black current representative signals RS, GS and BS for producing output kinescope bias control signals RB, GB and BB. As will be seen in connection with FIG. 2, these signals are respectively applied to red, green and blue video signal processing channels for maintaining a desired black current DC bias condition of the kinescope.

For AKB control purposes circuit 15 produces a so-called auxiliary "program pulse" P of fixed amplitude at output terminal 12 during a prescribed portion of each AKB operating control interval. In accordance with the principles of the present invention, for brightness control purposes the magnitude of pulse P is varied in accordance with the level of brightness control voltage VB from source 10 to produce a pulse P with a magnitude related to the setting of brightness control 12. Pulse P is coupled via a buffer transistor 25 to signal translating circuit 18a, 18b and 18c. Illustratively, in translating circuit 18a pulse P is coupled to a signal combining point A via a decoupling diode 26 and brightness tracking potentiometer 21. The role of pulse P will be better understood after considering the waveforms of FIG. 3 and the overall system as shown in FIG. 2.

In FIG. 3, signal V includes a positive pulse component occurring during the vertical retrace portion of the vertical blanking interval, which encompasses several horizontal line intervals (1 H) as illustrated in the waveform of signal H. AKB blanking signal B encompasses several horizontal line intervals including a clamp reference interval and sample interval within the AKB control interval. Negative-going pulse signal G is developed by circuit 15 during the clamp interval, from which a positive pulse component of a grid drive signal G' is developed for driving the grid electrode of the image reproducing kinescope during the clamp interval.

Signal RS, as developed at the collector output of amplifier transistor 20 in FIG. 1, is a negative going amplified version of a black current representative cathode output pulse induced when signal G' is applied to the kinescope grid electrode. Amplitude A of pulse RS varies by an amount "Δ" depending upon the deviation of the black current level from a desired level. Pulse P is a negative going pulse of amplitude A, and occurs during the sample interval following the clamp interval when pulse RS appears. Amplitude A of pulse P is fixed for a given setting of brightness control 10, and does not vary with changes in the kinescope black current level.

Signal RS is conveyed via transistor 20 to signal combining point A, and signal P is conveyed via potentiometer 21 to point A. A signal developed at point A, and AC coupled via capacitor 22 to sense input terminal 2 of AKB circuit 15, exhibits a magnitude related to the magnitude of the black current representative induced cathode output pulse. Kinescope bias control voltage RB for the red kinescope cathode is a function of the magnitude of pulse RS relative to the magnitude of pulse P, as described in detail in U.S. Pat. No. 4,484,228 of R. P. Parker except with respect to varying the magnitude of pulse P with the brightness control setting. Briefly, pulses RS and P are processed by AKB bias control circuit 15 such that, when the kinescope black current bias level is correct, the amplitudes of the pulses are equal, the voltage at point A does not change from the clamp interval to the sample interval, and the level of red cathode bias control voltage RB does not change. On the other hand, an incorrect black current bias condition will cause sensed pulse RS to exhibit a related amplitude variation of $\pm\Delta$. This amplitude variation relative to the amplitude of pulse P causes the voltage at point A to change by an amount $\pm\Delta$ from the clamp interval to the sample interval, and results in a corresponding change in the level of red bias control voltage RB until by feedback action (as will be seen in connection with FIG. 2) a correct black current bias condition is achieved and the amplitudes of pulses RS and P are equalized.

The black current conducted by the kinescope cathode is related to the DC bias of the cathode, and the brightness of a displayed image is related to the DC bias of the cathode. Since a correct cathode black current bias condition is determined by the relationship between the magnitudes of pulses P and RS, and since the magnitude of pulse P is related to the setting of brightness control 12, adjustment of brightness control 12 causes a change in the brightness of a displayed image. Varying the magnitude of brightness control voltage VB essentially serves to vary the difference between the magnitude of pulse P and a reference level. Brightness control can be achieved by modifying the magnitude of pulse P as discussed, and also by modifying the operating threshold of comparator circuits associated with input terminal 2 of AKB processor circuit 15. Additional details of the disclosed AKB and brightness control system of FIG. 1 are shown in FIG. 2.

In FIG. 2, low level color video signals r, g and b from a source 30 are respectively applied to similar preamplifier circuits 31a, 31b and 31c, each of which responds to a gain adjustment (GAIN ADJ.) input signal for varying the amplitude of video signals to be displayed, and to AKB blanking signal B. Blanking signal B inhibits the operation of preamplifiers 31a, 31b and 31c to prevent the color video signals from interfering with the operation of the AKB system during AKB intervals.

Amplified video signals from the preamplifiers are applied to respective display driver amplifier stages 32a, 32b and 32c which provide high level amplified color video signals RED, GREEN and BLUE suitable for directly driving intensity control cathode electrodes 42a, 42b and 42c of a color kinescope 46. Kinescope 46 is an in-line, self converging type with a control grid 44 common to each of cathode electrodes 42a, 42b and 42c. Grid 44 forms an electron gun assembly with each of cathodes 42a, 42b and 42c.

Since the display driver stages are similar, only the circuit details of red display driver 32a are shown in detail. Driver 32a comprises an input common emitter amplifier transistor 34 arranged in a cascode amplifier configuration with a video output common base transistor 36. A transistor 38 comprises an active load circuit for driver 32a. A high level RED video signal is developed at an emitter of transistor 38 and is AC coupled via a capacitor 40a and via a current path including a current limiting resistor 41a to red video signal cathode 42a. Similarly, GREEN and BLUE video output signals from drivers 32b and 32c are AC coupled via capacitors 40b and 40c and current limiting resistors 41b and 41c to kinescope cathodes 42b and 42c, respectively.

A bias control network 50 comprises the circuit elements of FIG. 1 with the exception of brightness control network 10. Red, green and blue cathode bias control signals RB, GB and BB from circuit 50 are provided as inputs to respective DC restoration clamping circuits 52a, 52b and 52c, the outputs of which are respectively coupled to video output signal current paths following AC coupling capacitors 40a, 40b and 40c. Clamp circuits 52a, 52b and 52c coact with capacitors 40a, 40b and 40c to maintain a desired restored DC bias condition for the associated kinescope cathodes. The magnitude of the restored cathode bias voltage is a function of the magnitude of input bias voltages RB, GB and BB. Each clamp circuit is normally keyed to operate during the so-called "back porch" portion of each horizontal line blanking interval in response to a keying signal K. Signal K is interrupted during AKB operating intervals by means of a switch 55 in response to AKB blanking signal B, whereby the operation of the clamp circuits are inhibited during AKB operating intervals to prevent the clamp circuits from distorting the induced black level representative cathode output pulse which is developed during AKB intervals.

A grid blanking signal generator 60 responds to horizontal (H) and vertical (V) deflection signals of the system for producing, during horizontal and vertical blanking intervals, a grid blanking signal GB which is applied via an electronic switch 62 to a grid drive circuit 64 including amplifier circuits. Switch 62 responds to AKB blanking signal B for interrupting the application of grid blanking signal GB to drive circuit 64 during AKB operating intervals. Grid drive circuit 64 also receives signal G which is developed by bias control circuit 50 during AKB intervals as discussed. Grid drive circuit 64 provides grid drive output signal G' to grid electrode 44. Grid drive signal G' includes a positive pulse component during AKB control intervals as shown in FIG. 3, and a negative grid blanking pulse component (not shown in FIG. 3) during horizontal and vertical blanking intervals outside of the AKB interval. At other times, i.e., during image trace intervals, signal G' exhibits a given DC level for biasing grid 44.

During AKB operating control intervals when the positive pulse component of grid drive signal G' is developed, the resulting positive black current representative induced cathode output pulse is coupled via capacitor 40a to the emitter of transistor 38 of red display driver 32a. A related positive version of the induced cathode output pulse appears across a load resistor 39 in the collector circuit of transistor 38 and is coupled to bias control unit 50 as signal RS, which is processed as discussed previously in connection with FIG. 1. Resulting red bias control signal RB is applied to clamp 52a for establishing a desired DC restored bias condition of red cathode 42a. The established DC bias of the red kinescope cathode is a function of the magnitude of the induced cathode output pulse and the setting of the brightness control, as discussed. The green and blue video signal channels operate in a similar manner.

What is claimed is:

1. In a video signal processing system including an image display device for displaying video information in response to a video signal applied to an intensity control assembly thereof, apparatus comprising:

a display driver stage for providing said video signal to said image display device;

means for providing an image brightness control signal;

means for generating a signal representative of the magnitude of black image current conducted by said display device during an interval within a prescribed control interval;

means for developing a further signal representative of the magnitude of said representative signal; and bias control means for providing an output bias control signal to said display device to maintain a desired bias condition for said display device in response to the magnitude of said further signal; wherein for controlling the brightness of an image displayed by said display means said image brightness control signal controls the magnitude of said further signal.

2. Apparatus according to claim 1, wherein

AC coupling means couples a video signal from an output of said driver stage;

a current path couples said video signal from said AC coupling means to said intensity control assembly; and said bias control means provides said output bias control signal to said current path.

3. Apparatus according to claim 1, wherein said means for developing said further signal includes means for generating an auxiliary signal of substantially fixed magnitude during said control interval; and means for coupling said representative signal and said auxiliary signal to a signal combining point prior to a sensing input of said bias control means; and wherein said image brightness control signal varies the magnitude of said auxiliary signal.

4. Apparatus according to claim 2 and further comprising:

clamping means with an input for receiving said bias control signal from said bias control means and an output coupled to said current path for restoring the DC voltage of said current path in accordance with the magnitude of said bias control signal from said bias control means; and means for inhibiting the operation of said clamping means when said representative signal is present.

5. Apparatus according to claim 1, wherein said image display device is a kinescope;

said intensity control assembly includes a cathode electrode and an associated grid electrode;

said generating means includes means for exciting said grid electrode during said control interval to produce a cathode output pulse with a magnitude representative of the magnitude of black current conducted by said kinescope;

said developing means develops an auxiliary pulse of substantially fixed magnitude during said control interval;

said cathode output pulse is conveyed to a signal combining point via a first path;

said auxiliary pulse is conveyed to said signal combining point via a second path;

said signal combining point is coupled to a sensing input of said bias control means; and said image brightness control signal is coupled to said second path for varying the magnitude of said auxiliary pulse.

* * * * *